United States Patent
Zhang et al.

(10) Patent No.: US 7,454,527 B2
(45) Date of Patent: Nov. 18, 2008

(54) ARCHITECTURE AND RELATED METHODS FOR STREAMING MEDIA CONTENT THROUGH HETEROGENEOUS NETWORKS

(75) Inventors: Qian Zhang, Hubei (CN); Wenwu Zhu, Basking Ridge, NJ (US); Ya-Qin Zhang, West Windsor, NJ (US); Fan Yang, Jiang Su (CN)

(73) Assignee: Microsoft Corporation, Redmond, WA (US)

( * ) Notice: Subject to any disclaimer, the term of this patent is extended or adjusted under 35 U.S.C. 154(b) by 1838 days.

(21) Appl. No.: 09/848,706

(22) Filed: May 2, 2001

(65) Prior Publication Data

US 2003/0018794 A1    Jan. 23, 2003

(51) Int. Cl.
    *G06F 15/16* (2006.01)
(52) U.S. Cl. .................. 709/249; 709/228; 709/230
(58) Field of Classification Search .......... 709/201, 709/203, 231, 227, 228, 230, 249; 370/231, 370/351, 392
See application file for complete search history.

(56) References Cited

U.S. PATENT DOCUMENTS 6,208,620 B1 * 3/2001 Sen et al. ............... 370/231
2001/0032232 A1 * 10/2001 Zombek et al. ......... 709/201
2001/0037358 A1 * 11/2001 Clubb et al. ............ 709/203
2002/0052968 A1 * 5/2002 Bonefas et al. ........ 709/231
2002/0075844 A1 * 6/2002 Hagen .................... 370/351
2002/0097722 A1 * 7/2002 Liao et al. .............. 370/392

OTHER PUBLICATIONS

LArzon et al., Efficient Use of Wireless Bandwidth for Multimedia Applications, Mobile Multimedia Communication, 1999, IEEE International Workshop.*

* cited by examiner

*Primary Examiner*—Douglas B Blair
(74) *Attorney, Agent, or Firm*—Lee & Hayes, PLLC

(57) ABSTRACT

A system for content (e.g., streaming media) is presented comprising a server, to provide media content on request through a wireline network, coupled to a wireless host through a network gateway. The network gateway establishes a communication channel from the server to the wireless host through both a wireline network and a wireless network, wherein the communication channel includes a transport layer protocol with control parameters for network elements of each of the wireline network and the wireless network. This abstract itself is not intended to limit the scope of this patent. The scope of the present invention is pointed out in the appending claims.

29 Claims, 8 Drawing Sheets

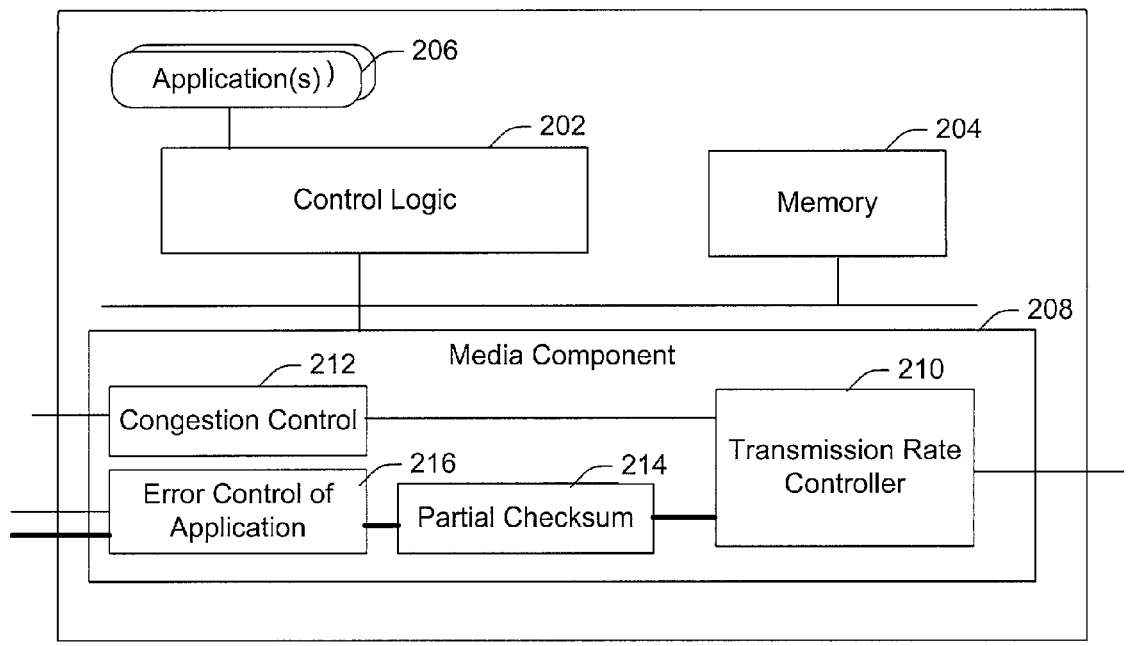
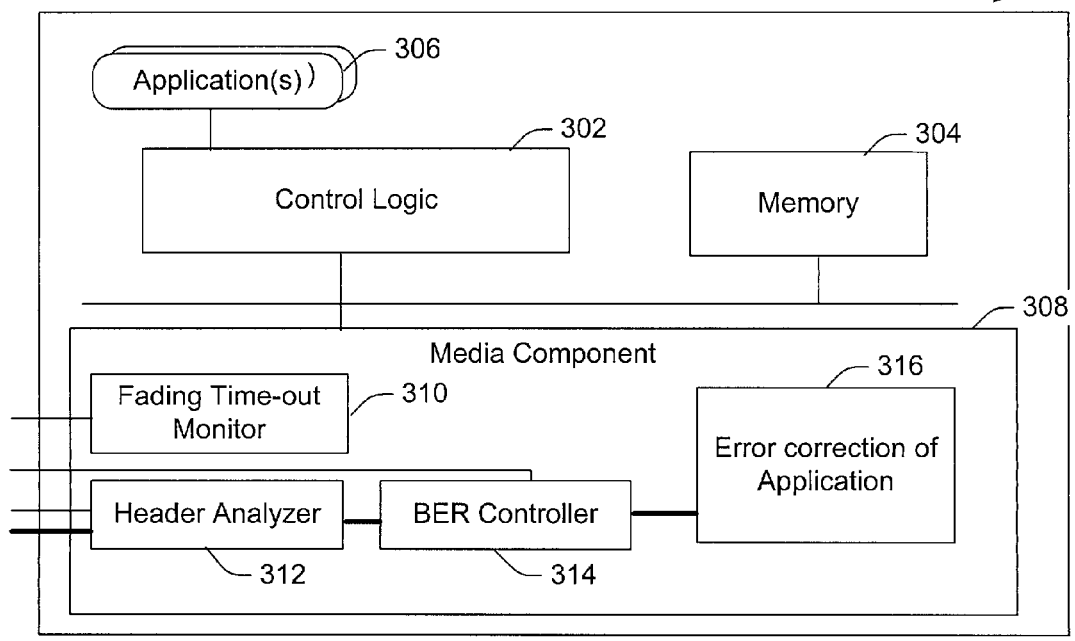

ARCHITECTURE AND RELATED METHODS FOR STREAMING MEDIA CONTENT THROUGH HETEROGENEOUS NETWORKS

TECHNICAL FIELD

This invention generally relates to an architecture and techniques for transmitting content through heterogeneous networks.

BACKGROUND

With recent improvements in processor, storage and networking technologies, today's wireless communications devices take many different forms, and offer a number of innovative features. Examples of this new class of wireless communication devices include personal digital assistant's (or, PDA's) fitted with a wireless communications interface, two-way paging devices, digital communications devices, and third-generation (or, 3G) personal communicators. Gone are the days when such devices are merely used to support verbal communication. Today, consumers are demanding that such devices be multifunctional, enabling a user to receive and/or retrieve email, to send/receive text messages, and to access text-based content from the Internet (e.g., stock quotes, flight arrival/departure information, etc.). Despite the recent innovation in the wireless communication space, consumers are demanding even greater application resources and functionality for their portable communications device. For example, despite recent advances in the functionality and capability of wireless access devices, no good solution exists for streaming media content over heterogeneous networks (e.g., a media streaming path comprising a wired network component and wireless network component).

Those skilled in the art will appreciate that streaming media content over a heterogeneous network comprised of a wired component and a wireless component is a very challenging task. One reason is that the transport layer protocol associated with each of the disparate components was developed independent of one another and, therefore, without regard for many of the design challenges of the other. For example, the control algorithm of a typical wireline transport layer protocol (e.g., TCP, UDP, etc.) assumes that any degradation in transmission quality is due to congestion problems in one or more of the network elements (e.g., router, switch, hub, etc.). Accordingly, conventional transport layer protocols will iteratively reduce the transmission rate until transmission quality is improved. However, in heterogeneous networks that include a wireless network component, the degradation in transmission quality may have nothing to do with congestion on the wireline component of the communication channel. That is, the degradation in transmission quality, measured in terms of a bit-error rate (or, BER), may well be caused by a fading condition, a shadowing effect, multipath sources, etc. in the wireless communication channel. It will be appreciated that reducing the transmission rate (assuming a congestion condition) will not improve transmission quality when the actual problem is a fading condition in the wireless component of is the communication channel. Despite such limitations, conventional transport layer protocols are often employed to provide the limited (often text-based) Internet content available to wireless devices. As a result, the wireless Internet access user experience is often disappointing.

Another limitation associated with such heterogeneous networks is error control in a scalable wireless communication channel. Conventional wireless error control schemes often employ a simple threshold, wherein if the BER of a packet exceeds the threshold, the packet is dropped. The assumption is that a couple of lost packets during the course of verbal communication will not be too offensive to the users of the system. If the number of dropped packets exceeds a certain threshold, the system may take corrective action, e.g., attempt to transition to a more reliable communication channel. Alternatively, the system will drop the call and the participants can attempt to reestablish the connection. While these often represent minor (although irritating) inconveniences for the user, they are accepted as a fact of life. When these same assumptions are employed in the data-intensive task of streaming multimedia content over a wireless channel, the minor inconvenience degrades into an unacceptable user experience, thereby limiting adoption of wireless multimedia streaming technology.

Thus, what is required is an architecture and related methods for streaming media content over heterogeneous networks, unencumbered by the limitations commonly associated with the transport layer protocol of conventional streaming architectures. Just such a solution is presented in the disclosure to follow.

SUMMARY

Described herein are one or more implementations of an invention. Such implementations concern an architecture and related methods for content (e.g., streaming media) over heterogeneous networks. In accordance with a first example embodiment, a system for streaming media content is presented comprising a server, to provide media content on request through a wireline network, coupled to a wireless host through a network gateway. The network gateway establishes a communication channel from the server to the wireless host through both a wireline network and a wireless network, wherein the communication channel includes a transport layer protocol with control parameters for network elements of each of the wireline network and the wireless network. It will be appreciated, given the description to follow, that incorporation of control parameters associated with each of the wireline and wireless networks enables the network gateway to distinguish transmission problems within each of the individual networks of the heterogeneous communication channel, facilitating accurate resolution of the transmission problem.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same reference numbers are used throughout the figures to reference like components and features.

FIG. 2 is a block diagram of an example content server suitable for use in the data network, according to one aspect of the present invention;

FIG. 3 is a block diagram of an example wireless host suitable for use in the data network, according to one aspect of the present invention;

DETAILED DESCRIPTION

This invention concerns an architecture and related methods for streaming content over a heterogeneous network including a wired network component and a wireless network component. In this regard, a transport layer protocol for reliably delivering content over a heterogeneous network is introduced. According to one aspect of the invention, the heterogeneous network transport layer protocol enables network elements (e.g., a network gateway) to distinguish wireless network transmission problems (e.g., fading, multi-path, etc.) from wireline transmission problems (e.g., network congestion), to facilitate a focused and timely resolution to such identified problems. In addition, a dynamic, channel-adaptive error control scheme for scalable media is introduced, further enhancing error control in the wireless network component of the heterogeneous network architecture.

As disclosed herein, the invention is described in the broad general context of computing systems of a heterogeneous network executing program modules to perform one or more tasks. Generally, these program modules include routines, programs, objects, components, data structures, etc. that perform particular tasks or implement particular abstract data types. In this case, the program modules may well be included within the operating system or basic input/output system (BIOS) of a computing system to facilitate the streaming of media content through heterogeneous network elements.

As used herein, the working definition of computing system is quite broad, as the teachings of the present invention may well be advantageously applied to a number of electronic appliances including, but not limited to, hand-held devices, communication devices, KIOSKs, personal digital assistants, multiprocessor systems, microprocessor-based or programmable consumer electronics, network PCs, minicomputers, mainframe computers, wired network elements (routers, hubs, switches, etc.), wireless network elements (e.g., basestations, switches, control centers), and the like. It is noted, however, that modification to the architecture and methods described herein may well be made without deviating from spirit and scope of the present invention.

Example Heterogeneous Network

Figure 1:
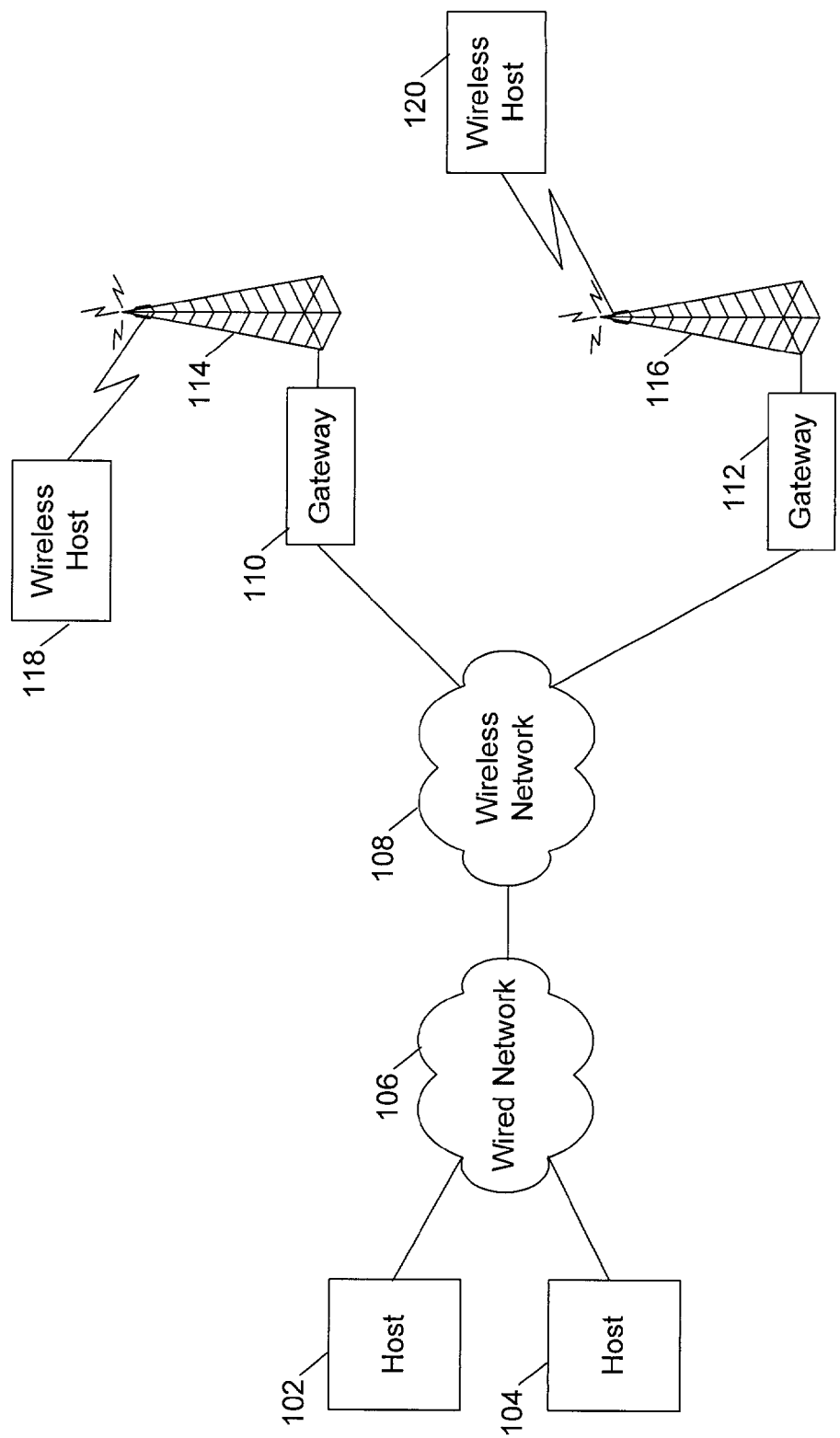
FIG. 1 is a block diagram of a data network within which the teachings of the present invention may be practiced.

Turning to FIG. 1, a block diagram of an example heterogeneous network is presented within which the teachings of the present invention may be practiced, according to one example embodiment. More specifically, FIG. 1 illustrates a block diagram wherein one or more wireline hosts 102, 104 (e.g., content servers) are coupled to provide data to one or more wireless hosts 118, 120 through a heterogeneous network comprised of a wired network component 106 and wireless network component 114 and 116. Unlike conventional heterogeneous data networks, however, FIG. 1 includes an innovative network gateway 110, 112 at the edge between the wired link and the wireless link (note, not necessarily between the wired network component and the wireless network component as the wired network component may well be coupled to control elements of the wireless network component in accordance with conventional wireline protocols). As will be discussed more fully below, network gateway 110, 112 is responsive to an innovative heterogeneous network transport layer protocol to dynamically adjust one or more transmission control parameters of one or more of the wired network component 106 and/or wireless network component 114/116 to alleviate transmission problems identified therein. That is, network gateway 110, 112 in conjunction with the innovative heterogeneous network transport layer protocol facilitate an efficient and accurate transmission control across heterogeneous network boundaries, thereby improving transmission quality and performance as compared to conventional solutions utilizing disparate transport layer protocols.

Network gateway 110, 112 is an intermediate network node coupling the wireline communication link with a wireless communication link. In this regard, the network gateway may well be a router, a switch, a hub, a wireless basestation controller, and the like. As introduced above, the gateway 110, 112 utilizes an innovative heterogeneous network transport layer protocol to accurately and efficiently distinguish wireline-related transmission problems from wireless-related transmission problems. In this regard, gateway 110, 112 computes and/or receives information in the transport layer regarding one or more transmission-related parameters, and issues control parameters uniquely associated with problems which arise in the individual network components (106, 114/ 116). For example, upon receiving an indication in the transport layer of a fading condition in the wireless link, gateway 110, 112 initiates corrective action in the wireless link. Similarly, if congestion is detected in the wireline communication link, gateway 110, 112 initiates corrective action designed to alleviate the problem in wireline link. That is, gateway 110, 112 does not initiate corrective action based merely on assumptions of where a transmission problem may lie, but rather on evidence of such a problem gathered from the heterogeneous network transport layer protocol.

As used herein, wireline host 102, 104 are each intended to represent any of a wide variety of computing devices which provide content to requesting users. According to one implementation, one or more of wireline host 102, 104 is a content server, to stream media content to requesting users upon request. In this regard, hosts 102, 104 may well comprise a personal computing system, a server computing system, a media server farm, a KIOSK, thin client hosts, thick client hosts, and the like. According to one implementation, to be described more fully below, wireline host 102, 104 invokes an instance of a content delivery application upon receiving a request for content from a requesting user. The wireline host 102, 104 implements congestion control at the transport layer based, at least in part on congestion feedback received from the gateway. Error control is performed at the application layer (e.g., by the content delivery application) and/or at the transport layer based, at least in part, on information received from the mobile host and gateway.

Wireless hosts 118, 120 are also intended to represent any of a wide variety of computing devices with wireless communication facilities. In this regard, wireless hosts 118, 120 may well comprise cellular telephones, digital wireless telephones, personal digital assistant (PDA) with wireless communication facilities, a personal computing system with wireless communication facilities, and the like. As will be developed more fully below, wireless host 118, 120 invokes an instance of an application to request and receive content from a wireline host 102, 104. According to one aspect of the invention, wireless host 118, 120 identifies transmission problems (e.g., multipath, fading, high BER problems, etc.) in the wireless communication channel (e.g., 114, 116), and informs the gateway of such wireless transmission problems via the innovative heterogeneous transport layer protocol described herein. As with the wireline host (102, 104), the wireless host 118, 120 implements application level and/or transport layer error control based, at least in part, on information received from the gateway.

The wired 106 and wireless 112/114 networks are each intended to represent a wide variety of such networks known in the art. In this regard, the wired network 106, for example, may well be comprised of a local area network (LAN), wide-area network (WAN), private network, global public network (Internet), and the like. Similarly, the wireless network 112/114 may well be comprised of a cellular telephony network, a third generation digital communication system network, a personal communication system (PCS) network, a digital cellular telephony network, a two-way paging network, a two-way radio network, a one-way broadcast radio network, a wireless local area network (WLAN) and the like. Similarly, the wireless communication channel between 114/116 and 118/120 is intended to represent any of a wide variety of wireless communication links such as, for example, a radio frequency (RF) communication link, an infrared (IR) communication link, and the like commonly associated with any of the wireless communication networks above. Insofar as each of these disparate network architectures were designed to address different problems and operating environments, it is readily understood that the transport layer protocol of a wireline network often differs from that of a wireless network. This gives rise to the control problems introduced above when one attempts to stream media across such network boundaries. The innovative network gateway 110, 112 overcomes the problems with the prior art in traversing such disparate network boundaries.

FIG. 2 is a block diagram of an example content server 200 suitable for use in the data network as, for example, wireline host 102, 104, according to one example embodiment. In accordance with the illustrated example implementation of FIG. 2, server 200 is generally comprised of control logic 202, a system memory 204, one or more applications, and a media component 208. As used herein, server 200 is communicatively coupled to a wireline network (e.g., 106) to provide a requesting user with media content. According to one implementation, an application 206 (e.g., streaming application) is selectively invoked to retrieve media content from some source (e.g., file, audio/video device, audio/video tape, etc.) into a local memory 204 for encoding and transmission to a requesting user via media component 208. In this regard, server 200 is intended to represent any is of a wide variety of network servers for streaming media content. For purposes of clarification from the onset it should be noted that, as presented in FIGS. 2, 3, 4 and 9, thin grey lines denotes a control flow of information, while the wider, darker lines denote the flow of data content (e.g., media content).

Control logic 202 selectively invokes and controls various functional elements of content server in response to requests for content. According to one embodiment, control logic 202 receives a request for media content from a remote host (e.g., wireless host 118), and selectively invokes an instance of a content delivery application 206 (e.g., a media streaming application) along with the resources of media component 208 to satisfy the request for content. According to one implementation, media component 208 is one of a plurality of applications 206 available on content server 200.

As used herein, control logic 202 and system memory 204 are intended to represent any of a wide variety of such devices known in the art. In this regard, control logic 202 may well include one or more of a processor, a microcontroller, an application specific integrated circuit (ASIC), programmable logic device (PLD), programmable array logic (PAL), and/or instructions which, when executed by one of the foregoing devices, implements such control logic. Similarly, memory 204 is intended to represent any of a wide variety of volatile and/or non-volatile memory such as, for example, random access memory, read-only memory, a hard disk, an optical disk, a magnetic tape, and the like.

As introduced above, media component 208 is selectively invoked by control logic 202 in response to a request for content from server 200. As shown, media component 208 is comprised of a congestion controller 212, an application layer error control interface 216, a partial checksum generator 214 and a transmission rate controller, each communicatively coupled as depicted.

Congestion controller 212 analyzes heterogeneous network transport layer protocol information for an indication from a coupled gateway (110, 112) of congestion in the wireline communication link coupling server 200 to the gateway (110, 112). More particularly, congestion controller 212 monitors the heterogeneous network transport layer protocol for an indication in the congestion control parameter of congestion in the wireline communication link. According to one implementation, the congestion control packet indicates the packet loss caused by congestion on the wireline communication link. Upon receiving such a control parameter, congestion control monitor calculates the available wireline communication channel bandwidth, e.g., based on the packet loss ratio and round-trip transmission time. For additional background information in this area, please see U.S. Provisional Application Ser. No. 60/208,659 titled "Resource Allocation in Multi-Stream IP Network for Optimized Quality of Service" and filed on May 31, 2000.

Additionally, congestion monitor 212 may also determine whether a period of retransmission of the dropped packets has elapsed, i.e., based at least in part on the available wireline communication channel bandwidth. Factoring in one or more of such congestion characteristics, congestion controller 212 instructs transmission rate controller 210 to smoothly adjust the transmission rate of the streaming content in an attempt to alleviate the congestion problem in the wireline communication link. Moreover, if the dropped packets are still available in local memory 204, and congestion controller 212 determines that there is available bandwidth and the retransmission time-out has not lapsed, congestion controller 212 may effect re-transmission of one or more of the dropped packets. According to one implementation, congestion controller 212 also takes into account one or more wireless communication link control parameters (e.g., fading, high BER indications, etc.) when making a determination of whether to retransmit dropped packets.

As alluded to above, transmission rate controller 210 controls the rate at which requested content is delivered to the wireline communication link for delivery to the requesting host (e.g., wireless host 118). As depicted, transmission rate controller 210 receives the content from the content delivery application (206) via an error control interface 216 of the application and a partial checksum generator 214. Based, at least in part, on instructions received from the congestion controller 212 and the partial checksum generator 214, transmission rate controller 210 delivers the requested content to the wireline communication link to match the available bandwidth of the wireline communication link.

The partial checksum generator 214 calculates a checksum of at least a portion of a subset of packets to be sent to the wireline link for purposes of error control in the transport layer. Conventional transport layer protocols (e.g., TCP, UDP, etc.) will drop any packet identified with errors. This is due, in part, to the relatively low BER experienced in wireline network communications. On the contrary, wireless communication channels suffer from a relatively high BER. As a consequence, wireless applications have been designed with robust error control mechanisms that enable them to be much more error tolerant. Recognizing this error tolerance attribute of wireless applications in general, and multimedia applications in particular, the heterogeneous network transport layer protocol utilizes a partial checksum policy.

According to one implementation of the partial checksum policy, the partial checksum generator 214 generates a checksum for only a portion of a given packet. According to one implementation, the portion of the packet for which a checksum is calculated is user-defined. As used herein, the checksum is only applied to the packet header, or a portion thereof. According to the partial checksum policy introduced herein, errors identified in the partial checksum portion of the packet are subject to transport layer error control facilities, to be described more fully below. Errors identified in the non-partial checksum portion of the packet are subject to the error control facilities of the application (i.e., application layer error control). In this regard, the heterogeneous network transport layer protocol provides for higher throughput taking into account the error control facilities of the wireline and wireless communication links, as well as the application layer.

The error control interface 216 monitors the heterogeneous network transport layer protocol for high bit-error rate indications from the gateway (110, 112). According to one implementation, if error control interface 216 receives a control parameter indication of a high BER, server 200 strengthens its error control facilities, and vice versa. Note that the error control is performed at the application level, because different applications will usually have different tolerances for error. According to an alternate implementation, media component 208 utilizes error control at the transport layer based, at least in part, on the content delivery application and the degree of BER, as denoted in the control parameter. According to one implementation, the indication of a high bit-error rate (BER) is determined from a negative acknowledgement (NACK) received from the requesting user, i.e., the wireless host (118, 120).

FIG. 3 is a block diagram of an example wireless host 300 suitable for use in the data network, according to one aspect of the present invention. As used herein, wireless host 300 may well be used in data network 100 as wireless host 118, 120. As introduced above, wireless host 300 is intended to represent a wide range of computing systems with wireless communication capability such as, for example, wireless telephony devices, PDA's with wireless communication capability, one- and/or two-way pagers, personal computing systems, and the like.

In accordance with the illustrated example embodiment of FIG. 3, wireless host 300 is generally comprised of control logic 302, memory 304, application(s) 306 and a media component 308, each coupled as shown. As above, each of control logic 302 and memory 304 are intended to represent such logic and memory as are typically found on such devices, and need not be described further. According to one example implementation, applications 306 include an application for receiving and rendering content from a communicatively coupled server (e.g., 102, 104). According to one example, applications 306 include an Internet browser application that enables a wireless host to access and receive content (e.g., media content) from an Internet server (e.g., 102, 104).

When an application is invoked to access and receive content from a wireline server (102, 104), control logic 302 invokes an instance of media component 308 to provide the requisite interface at the transport layer. In accordance with the illustrated example implementation of FIG. 3, media component 308 includes a fading time-out monitor 310, a header analyzer 312, a bit-error rate controller 314 and an application error correction interface 316, each coupled as shown.

In accordance with the partial checksum policy of the heterogeneous network transport layer protocol, header analyzer 312 checks the correctness of the packet header. If a packet header is corrupted, the wireless host sends a negative acknowledgment (NACK) to the gateway (110, 112). BER monitor 314 issues one or more control parameters denoting the BER in the transport layer protocol, in an attempt to invoke error control facilities of either the application layer and/or the transport layer. As introduced above, and will be described more fully below, upon receipt of a NACK, the gateway (110, 112) determines whether to resend the corrupt packet, to issue a command to the sender to strengthen error control (i.e., at one or more of the transport or application layer), etc. Often, this decision is based, in part, on a number of indicators factored together and is not, typically, the result of one single indicator (e.g., the NACK alone).

The fading time-out monitor 310 utilizes a time running at the wireless host during the connection, wherein every received packet resets the timer. If the timer runs out, the wireless host determines that a fading condition is occurring. In response, as soon as the wireless host emerges from the fading condition, fading time-out monitor 310 issues a fading control parameter, via the heterogeneous network transport layer protocol, to the gateway (110, 112) notifying the gateway of the fading condition. According to one implementation, fading time-out monitor 310 includes an indication of the last packet received before fading and the first packet received after fading in the fading control parameter.

In addition to the foregoing, media component 308 includes a BER monitor 314, which is in charge of reporting a BER to the sender at a regular interval. According to one implementation, BER monitor 314 calculates the number of corrupted packet headers during a period of time to establish a BER control parameter. In accordance with equation (1), below, the packet error probability (Pe) is expressed as a quotient of the number of corrupt packets (i) divided by the number of packets transmitted during a specified period of time.

$$Pe = \frac{i}{n}. \quad (1)$$

Taking the error dependency into consideration, the relationship between BER and Pe may well be expressed as:

$$Pe = \sum_{i=1}^{hl} b^i(1-b)^{hl-1}, \quad (2)$$

where: b is a single bit error;
h1 is the length of a packet header; and
Pe is the packet error probability.

Once computed, BER monitor 314 issues a BER report, via a BER control parameter in the transport layer protocol to at least the gateway and, in certain implementations, to the content server via the gateway.

Figure 4:
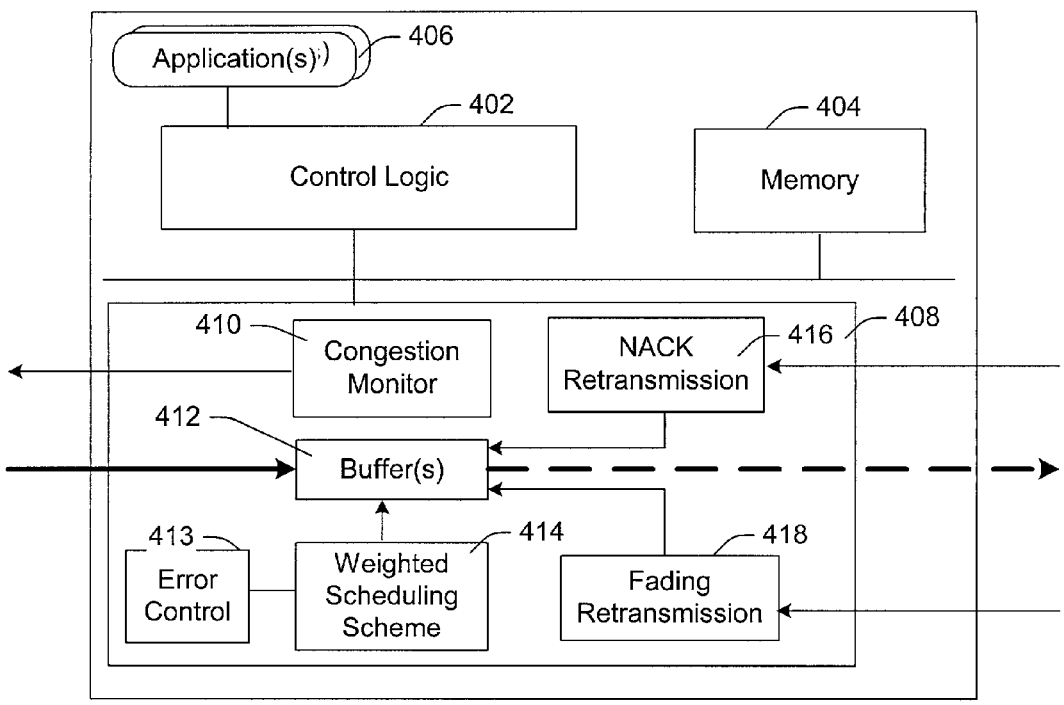
FIG. 4 is a block diagram of an example network gateway suitable for use in the data network, according to one aspect of the present invention.

FIG. 4 is a block diagram of an example network gateway 400 suitable for use in the data network, according to one aspect of the present invention. As used herein, gateway 400 may well be used in data network 100 as gateway 110 and/or gateway 112, to implement the teachings of the present invention. As introduced above, gateway 400 implements an innovative heterogeneous network transport layer protocol to distinguish wireless transmission problems from those transmission problems occurring in the wireline network component of the heterogeneous network. Additionally, as introduced above and described more fully below, the heterogeneous network transport layer protocol includes one or more control parameters which enable the gateway 400 to efficiently and accurately address transmission problems occurring in either network component.

As shown, gateway 400 is depicted comprising control logic 402, memory 404, one or more applications, and a media component 408, each coupled as shown. As introduced above, gateway 400 is intended to represent a wide range of is computing systems. In this regard, control logic 402 and memory 404 are each intended to represent any of a wide variety of control logic and memory which are typically found in such computing systems, and need not be further described herein.

In accordance with the illustrated example embodiment of FIG. 4, control logic 402 invokes an instance of the gateway media component 408 to facilitate the heterogeneous network transport layer protocol between network components of a heterogeneous network. As shown, gateway media component 408 includes a congestion monitor 410, data buffers 412, a weighted scheduling function 414, and one or more retransmission modules such as, for example, the NACK retransmission module 416 and the fading retransmission module 418, each coupled as depicted.

In general, data is received from a content provider (e.g., wireline host 102, 104) through a wireline network component into buffers 412 for subsequent delivery to the requesting wireless host (e.g., 118, 120) via a communication channel in the wireless network component. The buffer caches all data from the content server (200) in the order received. While retransmission is needed, or fading happens, the delivery time and loss ratio can be reduced by just transmitting the packet in the wireless link. That is, by buffering a certain amount of content locally, within the gateway, gateway buffers 412 reduce the burden on the heterogeneous network of having to re-transmit data from the originating content server. According to one implementation, the size of the gateway buffers is designed to be large enough to accommodate the packets sent during a typical fading condition. According to one implementation, the size of the gateway buffer is ten times (10×) the size of the number of packets received during an average fading condition.

Congestion monitor 410 calculates the amount of congestion experienced in the wireline network component of the heterogeneous network, and issues a report on the congestion on a periodic basis (or, upon request). As introduced above, congestion monitor 410 may well utilize any of a number of measures of congestion known in the art such as, for example, the packet loss ratio over a period of time, the round trip transmission time, and the like.

Suppose the whole data can be represented as a binary time series, $\{x_i\}_i^n = 1$, where $x_i$ takes 1 if the ith packet has arrived successfully and 0 if it is lost. Denoted $\hat{p} = n_{01}/n_0$ and $\hat{q} = n_{10}/n_1$, where $n_{01}$ is the number of times in the observed time series when 1 follows 0 and $n_{10}$ is the number of times when 0 follows 1. $n_0$ is the number of 0s and $n_1$ is the number of 1s in the trace. The packet loss ratio is given by $$P_L = \frac{\hat{q}}{\hat{p} + \hat{q}}$$

According to one implementation, the available bandwidth is estimated in the content server media component (e.g., 208) based on the periodic issuance of congestion control parameters by gateway 400. Considering the delivery requirements of the content to be delivery (e.g., multimedia), the content server media component smoothly adjusts the transmission rate based, at least in part, on the adjustment interval, packet loss ratio, and the bandwidth variations.

NACK retransmission module 416 monitors the heterogeneous network transport layer protocol for NACK (negative acknowledgements) issued by the wireless host to denote that the wireless host has not accurately received a packet. According to one example implementation, the wireless host only issues a NACK if a delay constraint can be satisfied, i.e., if the delay caused by retransmitting the packet does not exceed a threshold. According to one implementation, the sequence number of the corrupted packet is sent with the NACK. On receiving the NACK, the NACK retransmission module 416 controls gateway buffer 412 to retransmit the packet if it can be identified within the buffer.

Similarly, fading retransmission module 418 monitors the transport layer protocol for end of fading notifications from the wireless host. As alluded to above, the gateway is unable to sense the onset of a fading condition when it happens and continues to broadcast data packets to the wireless host as though everything were fine. Once the wireless host emerges from the fading condition, it issues a fading control parameter to the fading retransmission module 418 to inform the gateway of the fading condition. As alluded to above, the fading control parameter includes an indication of the last received packet before fading, from which fading retransmission module 418 determines what packet with which to restart the transmission. In the meanwhile, the fading control parameter includes an indication of the first received packet after fading, from which fading retransmission module 418 determines which packets needed to be retransmitted. According to one implementation, fading retransmission module 418 attempts to restart transmission with the first packet sent during the fading condition, if it is still available in the gateway buffers 412.

Weighted scheduling function 414 controls the transmission of content from the gateway buffers 412 to the receiving wireless host (300) based on a number of factors, e.g., content type, state of the wireless host, volatility of the content to be delivered, time sensitivity of the content to be delivered, etc. Considering the content priorities, the weighted scheduling function can be adapted to control the buffer so that optimal end-to-end quality can be achieved. Representative examples of weighted schedulers are Weighted Fair Queuing (WFQ) and Virtual Clock (VC). If the weights (the rates) in WFQ (in VC) corresponding to the individual queues are equal, the algorithms divide the capacity of the output link emulating a time-division multiplexer (TDM), i.e. they send the packets out almost in the same order that TDM would. If the weights are not equal, the queues share the capacity according to their weights, for example 1:1:3:4. If any of the queues has not enough packets to send out, the other queues share its portion according to their weights. WFQ and VC are implemented using virtual time and timestamps which determine the order of transmission.

Example Transport Layer Protocol Elements and Data Structures

Figure 5:
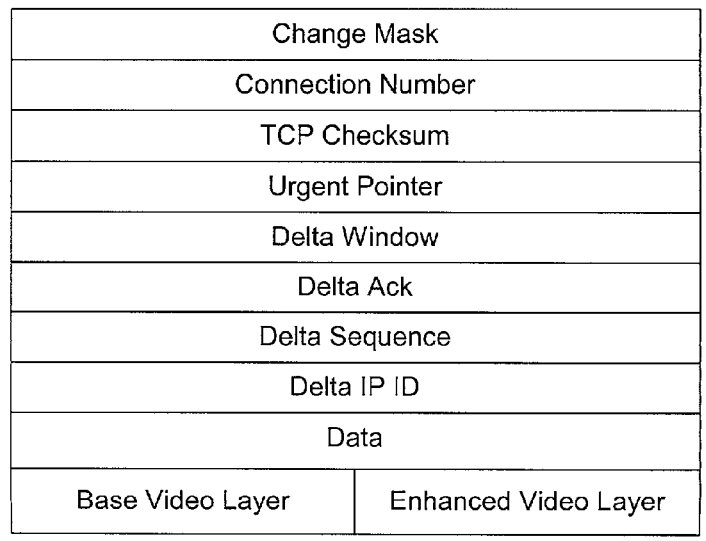
FIG. 5 is a block diagram of an example heterogeneous protocol layer that includes transport elements and data structures.

FIG. 5 is a block diauraxn of a heterogeneous protocol layer that includes transport elements and data structures. As introduced above, the innovative heterogeneous network transport layer protocol is designed to enable network elements (e.g., the gateway) to efficiently and accurately distinguish transmission problems occurring in any of a plurality of network components, e.g., a wireless network component, a wireline network component, and the like. In this regard, as introduced above, the heterogeneous network transport layer protocol includes a plurality of control parameters which, when enabled, provide an indication to one or more network elements of the existence of an error condition in one or more of the network components. In addition, one or more of the network elements (e.g., the sender, receiver, gateway, etc.) are responsive to receipt of such control parameters to attempt to resolve problems denoted by the received control parameters.

In accordance with the illustrated example implementation introduced above, four (4) example heterogeneous network transport layer protocol control parameters are introduced, which enable a gateway to accurately identify the source of transmission problems, and to effect a network component-specific resolution to the identified problem. In this regard, as introduced above, the four heterogeneous network transport layer protocol control parameters include:

Congestion control parameter: issued by the gateway to one or more wireline component network elements to throttle the delivery of content in accordance with current congestion statistics;

BER control parameter: issued by the wireless host to periodically inform the gateway and/or one or more wireline component network elements of the current BER at the wireless host;

Fading control parameter: issued by the wireless host to inform the gateway that the wireless host has just emerged from a fading condition; and Negative Acknowledge (NACK) control parameter: issued by the wireless host to the gateway to inform the gateway that the last packet sent was dropped due to high bit errors.

In accordance with the illustrated example introduced above, each of these control parameters include information which enable the receiving network element to act on the information to correct the problem identified. It is to be appreciated, given the foregoing discussion, that the innovative heterogeneous network transport layer protocol could well utilize more or less control parameters to facilitate reliable content delivery through disparate network components of a heterogeneous network without deviating from the spirit and/or scope of the present invention. Indeed, an expanded set of control parameters which address additional transmission issues is anticipated within the scope and spirit of the present invention.

Example Operation and Implementation

Having introduced the functional and architectural elements of the heterogeneous data network 100, an example operation and implementation is developed with reference to FIGS. 6 through 9. For ease of illustration, and not limitation, the teachings of the present invention will be illustrated within the exemplary implementation of a media streaming application introduced above. In accordance with this example implementation, a content source (wireline server) responds to a content request from a wireless host by streaming content through the heterogeneous network (wireline/wireless components) to the host (e.g., cellphone, PDA, etc.) via the gateway and a wireless communication channel. Unlike conventional heterogeneous content delivery solutions, however, the implementation described herein utilizes an innovative heterogeneous network transport layer protocol which enables one or more network elements (e.g., the gateway) to distinguish wireline transport problems from wireless transport problems. Accordingly, the discussion to follow will continue to reference elements of FIGS. 1-4.

Figure 6:
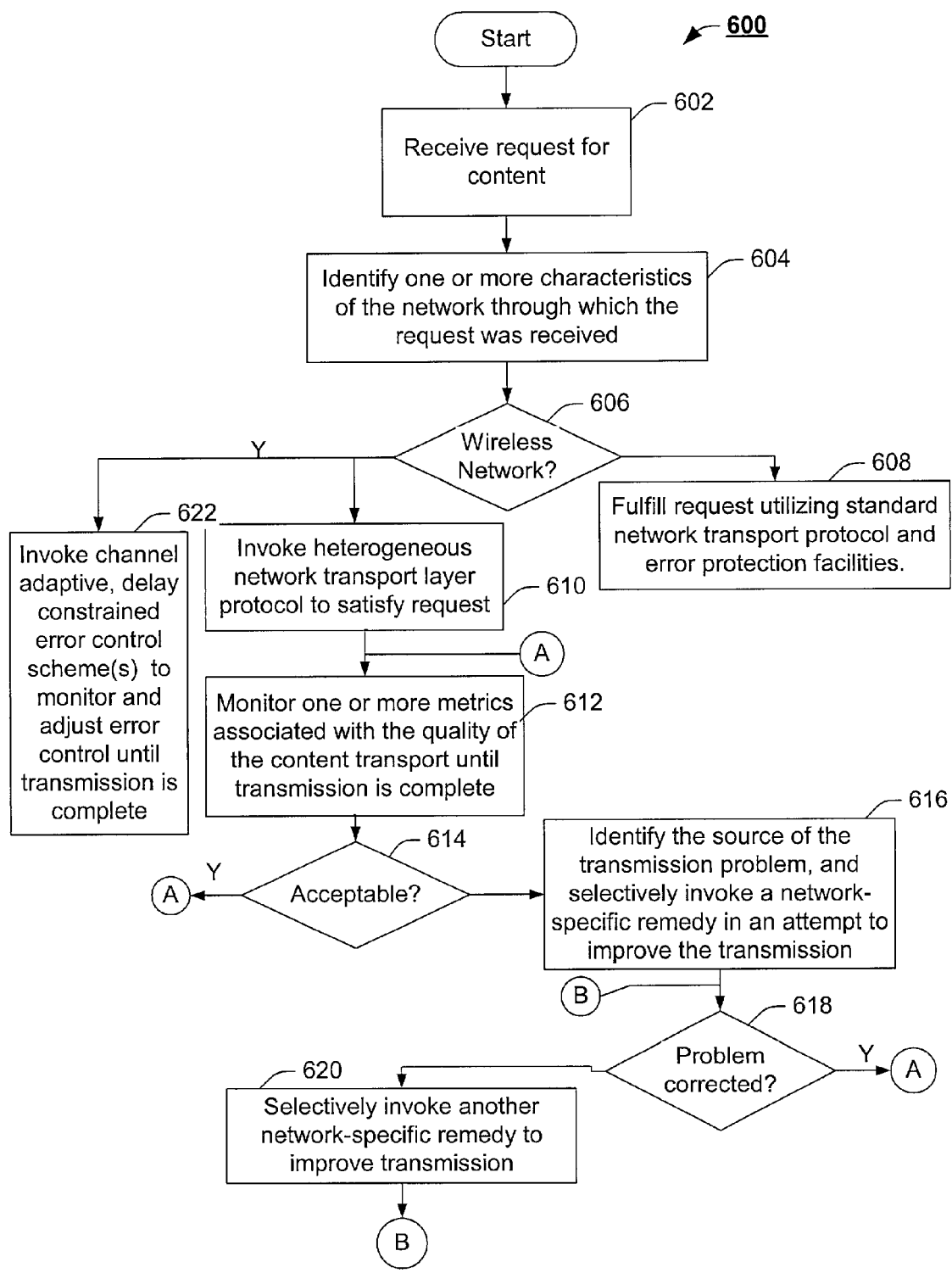
FIG. 6 is a flow chart of an example method for reliably delivering content across heterogeneous networks, according to one embodiment of the present invention.

FIG. 6 is a flow chart of an example method for delivering content across heterogeneous networks, according to one embodiment of the present invention. As shown, the method of FIG. 6 begins with block 602, wherein wireline server 102 receives a request for content from a wireless host 118. More particularly, wireless host 118 issues a request for content via wireless communication channel 114, gateway 110, wireless network 108, wireline network 106 to host 102. As introduced above, upon receiving such a request, control logic 202 of host 102 invokes an instance of media component 208 to facilitate content delivery.

In block 604, host 102 identifies one or more characteristics of the network through which the request was received. According to one implementation, host 102 identifies whether the requesting user is coupled to the content server 102 through a homogeneous network or a heterogeneous network, block 606. If the request was received through a homogeneous network (e.g., just a wireline network), content delivery server 102 fulfills the request utilizing a standard network transport protocol (e.g., TCP, UDP, etc.) and error protection facilities.

If, however, the request was received over a heterogeneous network consisting of, for example, a wireline network component and a wireless network component, the process continues utilizing the resources of the heterogeneous network transport layer protocol to satisfy the request, block 610. In this regard, as described above, each of the elements participating in the delivery of content to the requesting user (e.g., server, gateway, wireless host) issues and responds to one or more control parameters enabling the gateway 110 to monitor and uniquely control transmission characteristics in one or more of the network components comprising the heterogeneous network until the transmission is complete, block 612.

If, during the course of transmission, one of the elements identifies an unacceptable transmission condition 614, it is reported to the gateway 110. In response, gateway 110 distinguishes transmission problems arising in a wireline network component of the heterogeneous network from those occurring in the wireless network component based on the control parameter received, and selectively invokes a network component-specific remedy to alleviate the transmission problem, block 616. For example, receipt of a fading control parameter from the wireless host is uniquely identified by gateway 400, which then efficiently addresses the fading problem itself and/or in combination with other problems denoted by other network-centric control parameters.

In block 618, gateway 400 determines whether the network-centric remedy initiated in block 616 has worked to resolve the transmission problem. More particularly, in accordance with one embodiment, gateway 400 waits a period of time as it continues to monitor the heterogeneous network transport layer protocol of the communication channel for indications from one or more of the control parameters that the identified condition is subsiding. If so, the process continues with block 612 wherein transmission continues until the desired content has been delivered.

If, in block 618 it is determined that the implemented solution to the problem identified in block 614 is not resolving the problem, gateway 400 selectively invokes another network-specific remedy to improve transmission, as the process returns to block 616. That is, although the innovative heterogeneous network transport layer protocol enables network elements to efficiently identify transmission problems and implement network-centric solutions, often one or more failure modes may well have multiple causes. For example, a high BER may be realized as a mobile is entering a fading and/or multipath condition, causing one or more of the gateway 400, the source 200, etc. to initiate corrective action. Later, when the BER doesn't improve (and, perhaps, upon receipt of additional control parameters providing additional information into the root cause of the problem), the elements may well attempt additional corrective action measures to improve the transmission quality.

Figure 7:
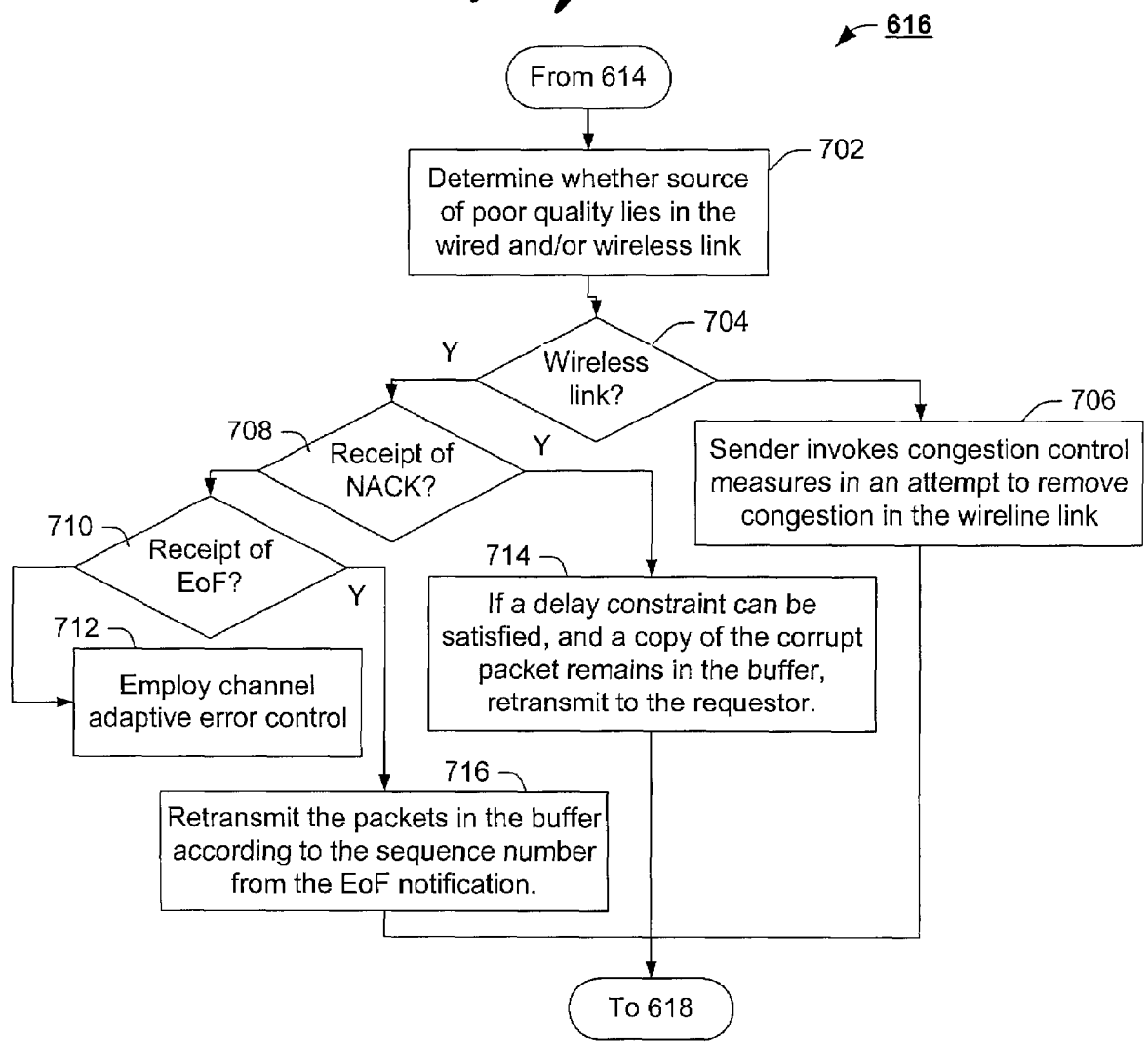
FIG. 7 is a flow chart of an example method for improving transmission quality in a heterogeneous network, according to one aspect of the present invention.

FIG. 7 is a flow chart of an example method for improving transmission quality in a heterogeneous network, according to one aspect of the present invention. In accordance with the illustrated example of FIG. 7, a more detailed description of identifying the source of transmission problems (block 616 of FIG. 6) is presented. As shown, the method begins with block 702 wherein a determination is made as to which network component of the heterogeneous network the source of the transmission problem lies. As introduced above, the heterogeneous network transport layer protocol includes a plurality of it control parameters, issued by one or more network elements, to identify network-centric transmission problems. Thus, a preliminary determination is made in block 702 of whether the transmission problem lies in the wireless or wireline link. As introduced above, this determination is made based, at least in part, on the is type of control parameter received.

If, in block 704, the gateway 400 identifies a congestion condition exists in the wireline network component (104) of the heterogeneous network 100, gateway 400 issues a congestion control parameter to upstream network elements supporting the wireline communication channel for corrective action. At the source, the server invokes congestion control measures in an attempt to remove the identified congestion from the wireline link, block 706.

If, in block 704, gateway 400 receives a control parameter from the wireless host, the type of control parameter received will determine the corrective action invoked by the gateway and, perhaps, other network elements supporting the heterogeneous communication channel. Accordingly, if in block 708 gateway 400 receives a negative acknowledgment (NACK) from the wireless host (300), gateway (400) determines whether the delay constraint can be satisfied and, if the packet remains in the buffer, retransmits the packet to the wireless host (300).

If, in block 710, gateway 400 receives an end-of-fading (EoF) control parameter from the wireless host (300), gateway 400 retransmits the packets in the gateway buffer (412), starting with the packet sequence number identified in the EoF notification.

If, in block 704, gateway 400 receives a high BER control parameter from the wireless host (300), gateway 400 forwards the received control parameter to the content server (200) which may well implement (or strengthen) error control mechanisms at the application layer. The source (e.g., server (200)) may invoke an innovative channel-adaptive error control scheme for scalable media over a wireless network component, block 712. As will be described more fully below, the channel-adaptive error control mechanism reduces high BER conditions by (1) accurate channel estimation that predicts or estimates in near-real time the bit-error rate or frame erasure rate of the communication channel; (2) given the estimated BER and/or FER, the gateway invokes a channel-adaptive hybrid delay constrained Automatic Repeat reQuest (ARQ) and Forward Error Correction (FEC) error control scheme; and (3) modifies bit allocation between a base content layer and an enhanced content layer at the source to limit the increase in wireless channel power required to improve the received BER at the wireless host.

Those skilled in the art will appreciate that gateway 400 in association with the heterogeneous network transport layer protocol unite transmission control of once disparate networks to facilitate reliable content delivery over such a heterogeneous network. Without such a heterogeneous network transport layer protocol the delivery of, for example, media content would be nearly impossible as the occurrence of transmission problems in either network component would result in both network components implementing corrective action, the result of which is typically the rapid degradation of content throughput, without a commensurate improvement in goodput—i.e., an unacceptable user experience.

Figure 8:
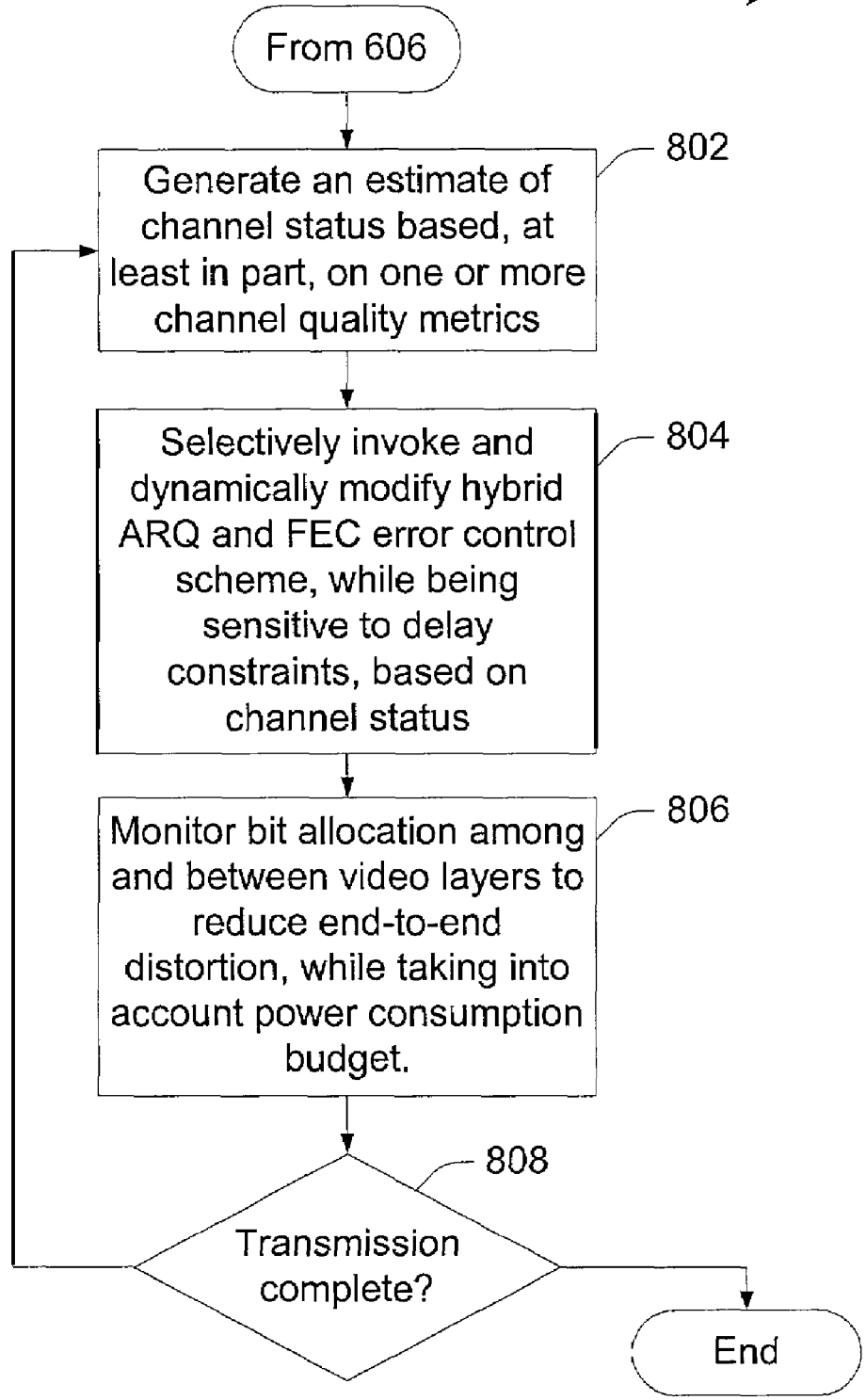
FIG. 8 is a flow chart of an example method of dynamic, channel-adaptive error control in the heterogeneous network, according to one embodiment of the present invention.

Turning next to FIG. 8, a flow chart of an example method of dynamic, channel-adaptive error control in the heterogeneous network is presented, according to one embodiment of the present invention. As introduced above, many media streaming applications benefit from a sophisticated error control scheme which makes them relatively error resilient. Such error control schemes do not, however, anticipate transmission over a heterogeneous network much less a network consisting of a wireless network component. Those skilled in the art will appreciate that often, error correction in a wireless communication channel requires an increase in transmission power (effectively raising the noise floor in the wireless network). Moreover, not all applications benefit from such an integrated error control system. Thus, despite the fact that a certain element of error control identified above is relegated to the application layer, it remains important to implement some level of error control in the transport layer.

In accordance with but an example illustrated embodiment, the method of FIG. 8 begins with block 802 wherein the gateway 400 generates an estimate of communication channel status based, at least in part, on one or more channel quality metrics and statistical modeling techniques, block 802. According to one implementation, channel modeling is performed by error control modules 413/216.

Channel Modeling

To accurately estimate channel status and have it mean anything in an error control scheme, one or more of the gateway 400 and or the source (e.g., server 200) monitors several channel-related characteristics on a near real-time basis. More particularly, each of gateway 400 and source 200 are depicted comprising error control modules 413 and 216, respectively. It is to be appreciated that such error control modules need not be identical but may, in certain implementations, include cross-over functionality. Thus, in describing the channel modeling feature, one or more of the error control modules 413/216 may perform this function.

According to one implementation, a channel bit error rate (BER) and fading depth characteristics are fed to the error control module 413/216 from the wireless host (300) via the physical layer, and applied to a dynamically evolving channel status model generated by error control module 413/216. According to one implementation, aiming at simulating wireless channels characterized by a slow-, highly correlated fading characteristics, a moderately slow-motion model of wireless host (300) is used by error control module 413/216 in its channel simulation. It is to be appreciated that the teachings of the error control module 413/216 may readily be applied to utilize other wireless host fading models, or that one of a plurality of models be dynamically chosen based, at least in part, on the monitored channel characteristics identified above.

According to one example implementation, the channel model employed by error control module 413/216 multiplies signal transmitted from the encoder by a Rayleigh-distributed amplitude factor taking into account the effect of fading, to which is added a Gaussian white noise signal. Error control module 413/216 generates the sequence of Rayleigh amplitude values by summing two squared Gaussian random variables, e.g., (x(i), y(i)) and taking the square root of the result. Channel correlation is taken into account by applying a low pass filter to the sequence of Gaussian values before squaring and summing them. The low pass filter used to account for channel correlation is built assuming the speed of the wireless host (300). Given such a speed, error control module 413/216 calculates the Doppler frequency, $f_{dopp}$, of the channel in accordance with equation (3) below:

$$f_{dopp} = \frac{v_{mob}}{c_o} f_0 \tag{3}$$

where: $v_{mob}$ is the speed of the mobile host;
$c_0$ is the speed of light; and
$f_0$ is the carrier frequency of the wireless channel.

It can be shown that for a broad range of parameters, the sequence of data-block success and failure could itself be approximated by means of a two-state Markov chain, whose transition probability matrix is given by:

$$Mc = \begin{pmatrix} p & 1-p \\ 1-q & q \end{pmatrix} \tag{4}$$

where: p and 1−q are the probabilities that the $j^{th}$ block transmission is successful, given that the $(j-1)^{th}$ block transmission was successful or a failure, respectively.

Using this model, the steady-state transport block error rate, $P_{BL}$, is given by $$P_{BL} = \frac{1-p}{2-p-q}. \tag{5}$$

For a Rayleigh fading channel with fading margin F, the average transport block error rate ($P_{BL}$) and the Markov parameter (q) can be expressed as $$P_{BL} = 1 - e^{-1/F}, \tag{6}$$

and 
$$q = 1 - \frac{Q(\theta, \rho\theta) - Q(\rho\theta, \theta)}{e^{1/F} - 1}, \tag{7}$$

where 
$$\theta = \sqrt{\frac{2/F}{1-\rho^2}}. \tag{8}$$

In the above, $\rho = J_0(2\pi f_{dopp} T)$ is the correlation coefficient of two successive samples (spaced by T seconds, which equals to 10 ms, 20 ms, 40 ms, or 80 ms in 3G network) of the complex Gaussian fading channel with Doppler frequency, $f_{dopp}$, which calculates in eqn. (3), $J_0(.)$ is the Bessel function of the first kind and zero order, and $Q(.,.)$ is the Marcum-Q function given by $$Q(x, y) = \int_y^\infty e^{-\frac{(x^2+w^2)}{2}} I_0(xw) w \, dw. \tag{9}$$

Continuing with the process of FIG. 8, having generated a statistical model of the communication channel, error control module 413/216 employs one or more error control schemes to reduce the distortion experienced in the receiver, block 804. More specifically, according to one example embodiment, error control module 413/216 selectively invokes and dynamically modifies a hybrid ARQ and FEC error control scheme, while being sensitive to delay constraints based, at least in part, on the modeled channel status.

Channel-Adaptive, Delay Constrained Error Control

Those skilled in the art will appreciate that, considering the time varying channel conditions, the distortion to be experienced in the receiver consists primarily of two parts: (1) the source distortion caused by media encoding, and (2) channel distortion caused by transmission errors. According to one implementation, error control module 413/216 derives a rate-distortion (R-D) of the scalable media, then formulates the distortion associated with the forward error control (FEC), the automatic repeat request (ARQ), and a hybrid combination of the two in order to reduce the distortion perceived by the receiver.

Rate-Distortion of the Scalable Media

As introduced above, the distortion in the receiver consists of source distortion and channel distortion. Regardless of transmission errors, source distortion is determined in large part by the operational R-D function SourceD(R) of the media encoder, where R is the source rate. On the other hand, bit error rate leads to channel distortion, Distortion(n), which depends primarily on the error resilience capability of the media codec. If variable length coding (VLC) is used in the media stream, a single lost codeword may well cause severe channel distortion. For video media, another important issue is interframe error propogation because errors may be visibly perceptible to the end-user over many consecutive frames. The distortion I the receiver can thus be modeled as:

$$D(R_S) = SourceD(R_S) + \sum_{n=1}^{R_j} P(n)Distortion(n) \quad (10)$$

where: P(n) is the probability that the $n^{th}$ bit is corrupted while the related bits are error free.

Rate-Distortion of the Forward Error Control (FEC)

Those skilled in the art will appreciate that forward error control (FEC) is well suited for error control in communication applications. However, the varying channel conditions commonly associated with wireless communication channels limits its effective application to wireless communication applications, since the worst-case design scenario often requires a prohibitively large amount of overhead to effectively use FEC. Leveraging the channel modeling above, however, error control module 413/216 employs adaptive FEC to facilitate delivery of media content over a wireless communication channel.

According to one implementation, error control module 413/216 applies different error correction rates based, at least in part, on the priority class of the content. According to one embodiment, the higher the priority, the more error correction rate is applied. On the other hand, each layer error control rate is also determined by the wireless network conditions. If the network conditions are good, error control module 413/216 reduces the rate of FEC. While the network conditions are bad, error control module 413/216 increases the FEC rate. Accordingly, the protection of the media is adaptive to media data priority as well as the current network conditions. In this regard, error control module may well employ FEC to the media stream while reducing the total amount of overhead typically associated with FEC in wireless communication channel applications. According to one implementation, the rate-distortion model introduced above is modified with the FEC as shown in equation (11), below:

$$D(R_S) = \quad (11)$$
$$SourceD(R_S) + \min_{(N_m,K_m)m=1,M} \left\{ \sum_{m=}^{M}\left(w_m \times \sum_{l=1}^{L_m} (D_{error}(l,m) \times P(l,m))\right)\right\}$$

where: $w_m$ is the distortion weight for the $m^{th}$ layer;
$D_{error}$ represents the channel distortion that $1_{th}$ symbol in the $m^{th}$ layer is corrupted;
M is the total number of layers; and
$L_m$ is the total number of symbols in the $m^{th}$ layer.

To avoid overlapped channel distortion, P(l,m) is the probability that the $1_{th}$ symbol of the $m^{th}$ layer is corrupted, while the corresponding symbols in the previous layers are correct. $N_m, K_m$ represent block length and information length, respectively, of layer m, respectively, which are related to the probability of P(l,m).

Rate-Distortion of Automatic Repeat reQuest (ARQ)

Closed loop error control techniques such as ARQ have been shown to be more effective in certain situations and implementations than FEC. However, retransmission of corrupted data frames introduces additional delay into the communication channel, delay which may prove prohibitively expensive in near-real time content delivery applications. Accordingly, the content delivery system 100 implements a hybrid ARQ architecture, wherein the sender monitors certain transmission channel characteristics, along with a protection degree. According to one example, content source 200 monitors a delay constraint, $D_{constrained}$, which is limited by media frame rate, current roundtrip transmission time (RTT) and the estimated time consumed by processing procedure, $D_{processing}$. In addition, according to one implementation, the sender also designates the protection degree for the content to be delivered to the requestor. Accordingly, the maximum transmission times of current packet $N_{max}$ is calculated as:

$$N_{max} = \frac{D_{constrained} - D_{processing}}{RTT} \quad (12)$$

The receiver (e.g., wireless host 300), when any error is detected after channel decoding, decides whether to issue a retransmission request based on the delay bound of the packet. If the delay bound has not expired, the request will be sent. In response, the content source (200) will only transmit corresponding information of the error packet. It can be observed, given the foregoing, that the receiver has more redundant information using ARQ. If the redundant information is orfganized elaborately, the probability of error can be reduced considerably as Nmax increases. Thus, the rate-distortion model of ARQ is formatulated as:

$$R = R_S + R_1 + \sum_{i=2}^{N_k} P(i) * R_i \quad (13)$$

$$D(R) = SourceD(R_S) + P(N_{max}) * D(N_{max}) \quad (14)$$

where: P(i) is the probability of the $i^{th}$ transmission of the error packet;
$D(N_k)$ is the distortion of the $N_k^{th}$ transmission of packet k;
$R_i$ is the bit rate for the $i^{th}$ transmission.

Rate-Distortion of a Hybrid FEC and ARQ scheme

As introduced above, FEC and ARQ are both useful means of error control. FEC is suited for real time communications under high BER and short fading wireless channel, while ARQ does well under low BER and long fading wireless channel conditions. As introduced above, a hybrid ARQ scheme may achieve both delay bound and rate effectiveness. The procedure of the hybrid FEC and ARQ is similar to the ARQ scheme described above, with the difference being that in each retransmission stronger protection is added at the content server (200), wherein the higher protection is achieved and the overhead maintained at a relatively small size. Thus, in accordance with one example implementation, the rate-distortion model of equation (11) above is modified as:

$$D(R_S) = SourceD(R_S) + \quad (15)$$
$$\min_{(N_m,K_m)m=1,M}\left\{\sum_{m=}^{M}\left(w_m \times \sum_{l=1}^{L_m}(D_{error}(l,m) \times P(l,m,N_{max}^m))\right)\right\}$$

That is, equation (11) is modified with the inclusion of $P(l, m, N_{max}^m)$, which is the probability that the $1_{th}$ symbol of the $m^{th}$ layer at $N_{max}^m$ retransmission is corrupted while the corresponding symbols in the previous layers are correct.

Continuing with block 806 of FIG. 8, once the appropriate ARQ and/or FEC error correction scheme is selectively invoked (block 804), the sender (200) monitors bit allocation among and between data layers to reduce end-to-end distortion, while maintaining a minimal amount of overhead (i.e., directly related to power consumption). One of the challenging tasks for streaming multimedia content, for example, over a wireless channel is how to allocate the bit budget to the source and the channel. Because the media content serviced is scalable, it can be divided into two parts, e.g., important media data (IMD) and less important media data (LMD). According to one implementation, the error processing scheme of processing system 100 applies different error control schemes to IMD and LMD according to their respective priorities, and characteristics of the media is (e.g., audio vs. video vs. text, etc.).

Bit Allocation Scheme

Let R(t) represent the channel rate available for transmission at time . Let $R_s(t)$, $R_{Hybrid}(t)$ and $R_{FEC}(t)$ denote the source rate, hybrid error control rate for IMD and FEX rate for LMD at time t, respectively. Then the problem becomes to allocate the available bit rate at time t such that the optimal $R_s(t)$, $R_{Hybrid}(t)$ and $R_{FEC}(t)$ are achieved by minimizing the end-to-end distortion under the constraint:

$$R_S(t)+R_{Hybrid}(t)+R_{FEC}(t) \leq R(t) \quad (16)$$

Using the rate-distortion models developed above, equation (16) can be re-written as:

$$(R_S, R_{Hybrid}, R_{FEC})_{opt} = \quad (17)$$

$$\underset{R_S, R_{Hybrid}, R_{FEC}}{\operatorname{argmin}} \left\{ SourceD(R_S) + P(N_{\max}) * D_{IMD}(N_{\max}) + \underset{(N_m, K_m)m=1, M}{\min} \sum_m \left( w_m \times \sum_{l=1}^{L_m} D_{error}(l, m) \times P(l, m) \right) \right\}$$

subject to $R_S + R_{Hybrid} + R_{FEC} \leq R$.

The second term on the right side of equation (17) represents the channel distortion resulting in IMD with error correction rate $R_{hybrid}$, while the third term denotes the channel distortion resulting in LMD with error correction rate $R_{FEC}$. In this regard, the bit allocation scheme presented takes into account the relative priority of content within each layer and the channel conditions to reduce distortion and improve transmission quality, minimizing any increase in transmitted overhead and, thus, power consumption.

In block 808, a determination of whether transmission has completed is made. If so, the process ends, otherwise it continues with block 802, as described above.

Figure 9:
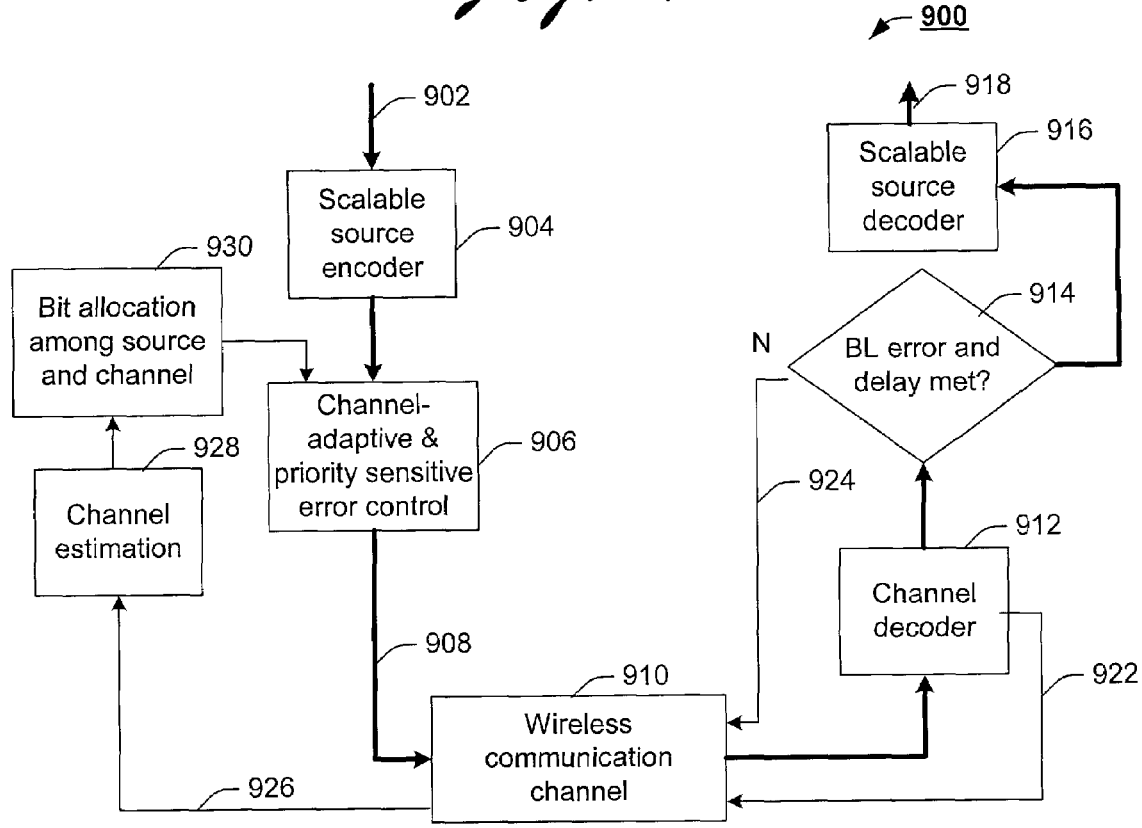
FIG. 9 is a communication diagram of an example dynamic, channel-adaptive error control scheme for scalable media over a wireless network, according to one aspect of the present invention.

To further illustrate the process introduced in FIG. 8, above, attention is now drawn to FIG. 9 wherein a graphical illustration of an example dynamic, channel-adaptive error control scheme for scalable media over a wireless network is presented, according to one aspect of the present invention. As above, thick black lines in the figure denote data content, while narrower grey lines denote control content.

In accordance with the illustrated example implementation of FIG. 9, the communication model 900 is presented comprising a scalable content encoder (e.g., media encoder) 904, channel-adaptive, unequal error control module 906, the wireless communication channel 910 (e.g., 114), a channel decoder 912, and a scalable source content decoder 918. In accordance with the error control scheme introduced above, the scalable source content encoder 904, which may reside in the source (200) and/or gateway (400), receives content 902 and encodes it in accordance with the compression mechanism associated with the wireless communication channel 910. Once encoded, the encoded content is passed through the channel-adaptive, priority sensitive error control module 906 (again, at source (200) and/or gateway (400)) before communication to a requesting wireless host (300) via the wireless communication channel 910.

Once received at the wireless host (300), the content is passed through a channel decoder 912 before passing through a scalable source content decoder 916 to retrieve a representation of the content sent from the source (200). In accordance with the teachings of the present invention, the wireless host (300) determines whether the base layer (e.g., comprising the IMD) error threshold has been met, and whether the delay constraint has been met, block 914. If not, such an error condition is issued (e.g., in a high BER control parameter) to the gateway (400) and/or the source (200). In addition, the channel decoder 912 provides feedback information (e.g., high BER, NACK, fading condition control parameters) associated with the quality of the transmission over the wireless communication channel to the source (200) and/or gateway (300).

As introduced above, the channel estimation module 928 in the gateway receives such information and dynamically generates a model of the wireless communication channel. As introduced above, the error control module 906 may well reside in the source (200) (i.e., as application error control interface). In response to such information, module 930 controls a bit allocation among the source content and channel protection to reduce the distortion of the received content, while limiting the amount of overhead added to the communication channel, thereby limiting any additional power consumption incurred as a result of the error control mechanism.

Example Computing Environment

Figure 10:
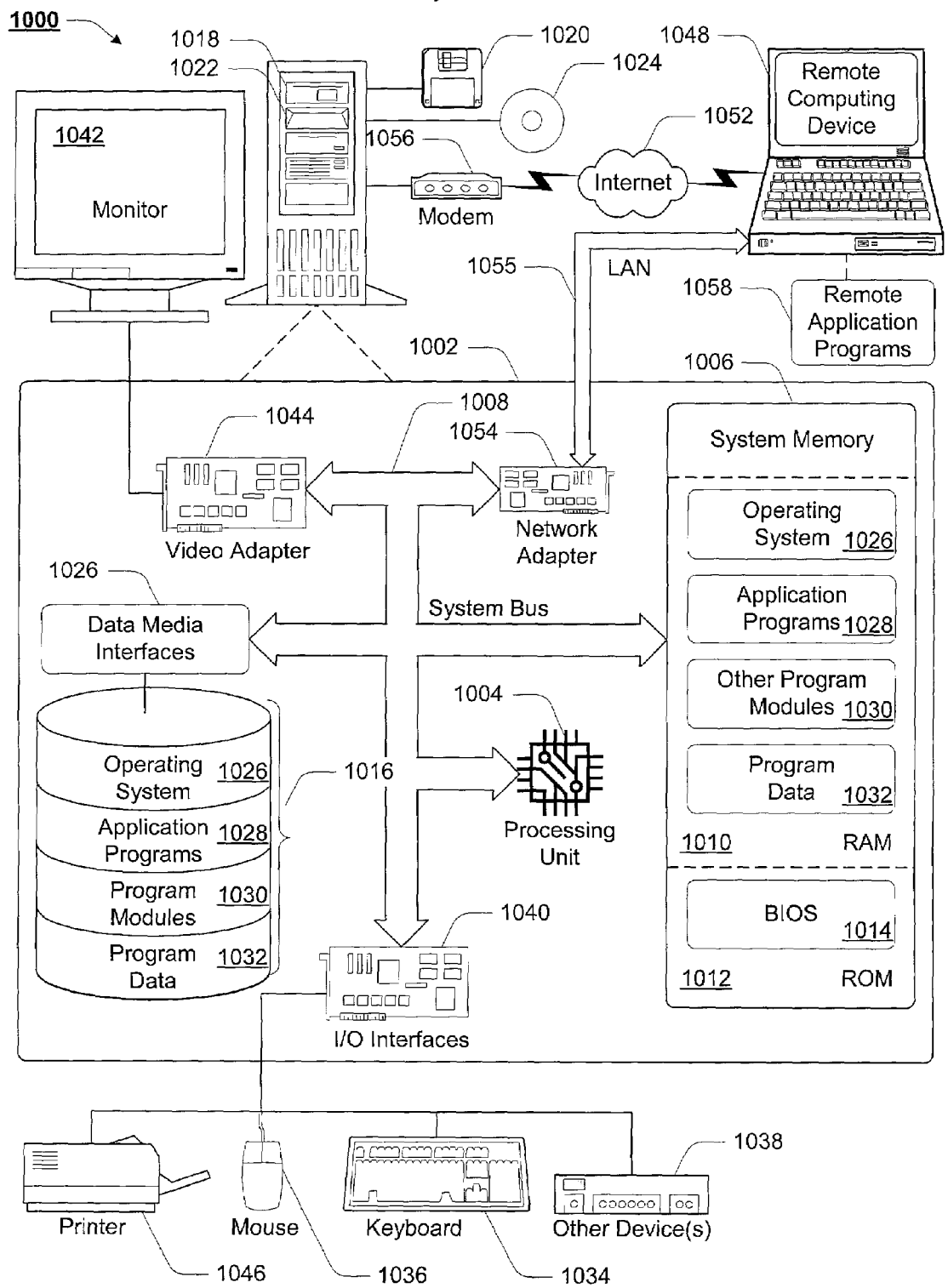
FIG. 10 is a block diagram of an example computing system suitable for use in implementing one or more of a content source, a wireless host, and/or a network gateway, according to one example embodiment.

FIG. 10 illustrates an example of a suitable computing environment 1000 on which one or more elements of the innovative heterogeneous network for streaming media content may be practiced. It should be appreciated that computing environment 1000 is only one example of a suitable computing environment and is not intended to suggest any limitation as to the scope of use or functionality of the streaming architecture. Neither should the computing environment 1000 be interpreted as having any dependency or requirement relating to any one or combination of components illustrated in the exemplary computing environment 1000.

The example computing system 1000 is operational with numerous other general purpose or special purpose computing system environments or configurations. Examples of well known computing systems, environments, and/or configurations that may well benefit from the heterogeneous network transport layer protocol and dynamic, channel-adaptive error control schemes described herein include, but are not limited to, personal computers, server computers, thin clients, thick clients, hand-held or laptop devices, multiprocessor systems, microprocessor-based systems, set top boxes, programmable consumer electronics, wireless communication devices, wireline communication devices, network PCs, minicomputers, mainframe computers, distributed computing environments that include any of the above systems or devices, and the like.

Certain features supporting the streaming architecture, e.g., the heterogeneous network transport layer protocol, the dynamic, channel-adaptive error control scheme, etc. may well be described in the general context of computer-executable instructions, such as program modules, being executed by a computer. Generally, program modules include routines, programs, objects, components, data structures, etc. that perform particular tasks or implement particular abstract data types.

As shown in FIG. 10, the computing environment 1000 includes a general-purpose computing device in the form of a computer 1002. The components of computer 1002 may include, but are not limited to, one or more processors or execution units 1004, a system memory 1006, and a bus 1008 that couples various system components including the system memory 1006 to the processor 1004.

As shown, system memory 1006 includes computer readable media in the form of volatile memory 1010, such as random access memory (RAM), and/or non/volatile memory 1012, such as read only memory (ROM).

While not depicted, computer 1002 may further include other removable/non-removable, volatile/non-volatile computer storage media. By way of example only, a hard disk drive, a magnetic disk drive (e.g., a "floppy disk"), and/or an optical disk drive may also be implemented on computing system 1002 without deviating from the scope of the invention. Moreover, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

Bus 1008 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

A user may enter commands and information into computer 1002 through input devices such as keyboard 1034 and/or a pointing device (such as a "mouse") 1036 via an input/output interface(s) 1040. Other input devices 1038 may include a microphone, joystick, game pad, satellite dish, serial port, scanner, or the like, coupled to bus 1008 via input/output (I/O) interface(s) 1040.

Display device 1042 is intended to represent any of a number of display devices known in the art. A monitor or other type of display device 1042 is typically connected to bus 1008 via an interface, such as a video adapter 1044. In addition to the monitor, certain computer systems may well include other peripheral output devices such as speakers (not shown) and printers 1046, which may be connected through output peripheral interface(s) 1040.

Computer 1002 may operate in a networked environment using logical connections to one or more remote computers via one or more I/O interface(s) 1040 and/or network interface(s) 1054.

Alternate Embodiments—Computer Readable Media

Figure 11:
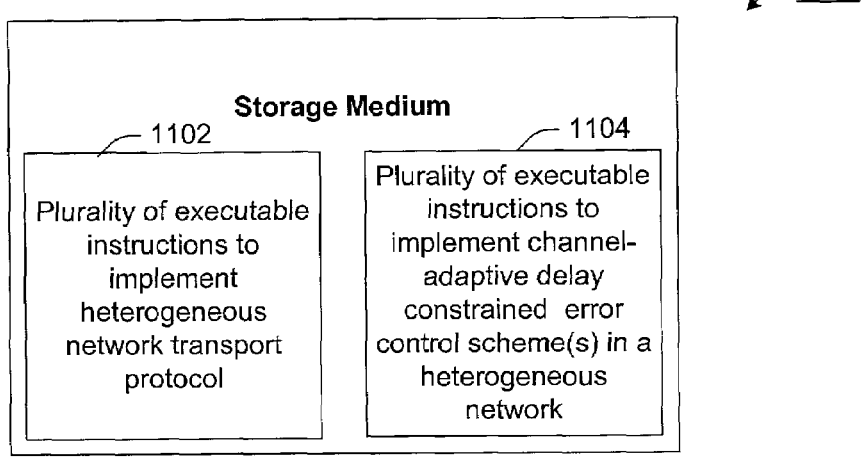
FIG. 11 is a graphical illustration of an example storage medium including instructions which, when executed, implement the teachings of the present invention, according to one embodiment of the present invention.

Turning to FIG. 11, an implementation of one or more elements of the architecture and related methods for streaming content across heterogeneous network elements may be stored on, or transmitted across, some form of computer readable media in the form of computer executable instructions. According to one implementation, for example, instructions 1102 which when executed implement one or more elements of the heterogeneous network transport layer protocol, the media component of the content source 200, wireless host 300, and/or the network gateway 400, and/or instructions 1104 to implement the dynamic, channel adaptive error control scheme of the content delivery system 100 may well be embodied in computer-executable instructions. As used herein, computer readable media can be any available media that can be accessed by a computer. By way of example, and not limitation, computer readable media may comprise "computer storage media" and "communications media."

As used herein, "computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

FIG. 11 is a block diagram of a storage medium 1100 having stored thereon a plurality of instructions including instructions to implement a heterogeneous network transport layer protocol 1102 and/or a dynamic, channel-adaptive error control scheme for scalable media according to yet another embodiment of the present invention.

As used herein, storage medium 1100 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Accordingly, the software implementation of FIG. 10 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. It will be appreciated, given the foregoing, that the teachings of the present invention extend beyond the illustrative example implementation presented above. For example, the teachings of the present invention are equally applicable to an implementation wherein the content server is the wireless host and the receiving host is an element of a wireline network. Similarly, the heterogeneous network transport layer protocol and/or the dynamic, channel-adaptive error control scheme may also be beneficially applied to streaming content solely through a wireless network. Thus, the specific features and steps are disclosed as merely example forms of implementing the claimed invention.

The invention claimed is:

1. A system comprising:
   a network server, to provide media content on request through a wireline network;
   a wireless host to request media content through a wireless network; and
   a network gateway, coupled to each of the server and the wireless host, to establish a communication channel from the server to the wireless host through both the wireline network and the wireless network, wherein the communication channel includes a transport layer protocol with control parameters for each of the wireline network and the wireless network, wherein the protocol includes a fading parameter which, when asserted provides a receiving network element with an indication that a communicatively coupled wireless host just emerged from a fading condition.

2. A system according to claim 1, wherein the transport layer protocol of the communication channel enables the network gateway to distinguish transmission problems occurring within either network component of the communication channel.

3. A system according to claim 1, wherein the network server comprising:
   a transmission rate controller to receive media content from an application and control transmission over the wireline network; and
   a congestion controller, to receive congestion control indications from the network gateway in the transport protocol, estimate the available bandwidth over the network, and to instruct the transmission rate controller to adjust the transmission rate accordingly.

4. A system according to claim 1, the network server further comprising:
   an application error control interface, to receive a bit-error rate (BER) control parameter from the network gateway via the transport protocol denoting the bit-error rate (BER) experienced at the wireless host; and
   a partial checksum generator, responsive to the application error control interface, to generate checksum of a dynamically selected amount of the requested content for inclusion in at least a subset of transmitted frames for error control purposes based, at least in part, on the received BER control parameter.

5. A system according to claim 4, wherein the partial checksum generator includes more data in the partial checksum when the BER increases, less data when the BER decreases.

6. A system according to claim 1, the wireless host comprising:
   a fading timeout monitor, to identify degradation in transmission quality in the wireless network component resulting from fading and/or multipath conditions, and to issue a fading condition control parameter to the network gateway via the transport layer protocol.

7. A system according to claim 6, wherein the fading condition control parameter includes an indication to the network gateway of what frame to commence retransmission of content lost due to fading and/or multipath.

8. A system according to claim 1, the wireless host comprising:
   a header analyzer, to analyze at least a partial checksum in a header of a received frame of media content to determine whether an accurate frame was received; and
   a bit-error rate (BER) controller, coupled to the header analyzer, to generate a BER control parameter for the network gateway via the transport layer protocol denoting a running average of accurately received frames.

9. A system according to claim 1, the network gateway comprising:
   a congestion monitor, to monitor congestion of the communication channel, and to issue a congestion control parameter to the network server via the transport layer protocol.

10. A system according to claim 1, the network gateway comprising:
    a buffer, to receive frames of media content from the network server via the wireline network component of the communication channel, and to selectively provide frames of the received media content to the wireless host via the wireless network component of the communication channel.

11. A system according to claim 10, the network gateway further comprising:
    a weighted scheduling module, coupled to the buffer, to schedule delivery of media content from the buffer to the wireless host based on their priority.

12. A system according to claim 10, the network gateway further comprising:
    one or more retransmission modules, coupled to the buffer, to receive one or more of a negative acknowledgment (NACK) control parameter and/or a fading control parameter and determine whether the requested retransmission of one or more frames can be accommodated.

13. A system according to claim 12, wherein the one or more retransmission modules determine whether the requested retransmission may occur by determining whether a start frame, identified within the received control parameter, is available within the buffer.

14. A system according to claim 1, wherein the transport layer protocol comprises:
    a congestion control parameter, generated by the network gateway in response to congestion detected along the communication channel.

15. A system according to claim 14, wherein the congestion control parameter is sent to the server for purposes of throttling transmission of the media content.

16. A system according to claim 1, wherein the transport layer protocol comprises:
    a fading control parameter, generated by a wireless host to provide an indication to the network gateway that the wireless host has just concluded a period of fading.

17. A system according to claim 16, wherein the network gateway retransmits one or more frames of media content commencing at a frame denoted by a received fading control parameter.

18. A system according to claim 1, wherein the transport layer protocol comprises:
    a negative acknowledgment (NACK) control parameter, generated by the wireless host to denote one or more frames of media content received with an unacceptably high bit-error rate (BER).

19. A method comprising:
    receiving a request from a wireless host for content available from a network server;

establishing a communication channel to service the request between the wireless host and the network server over a wireless network and a wireline network coupled to the server; and adjusting transmission characteristics in one or more of the wireline network and/or the wireless network to improve transmission quality based, at least in part, on one or more control parameters of a transport layer protocol of the communication channel which distinguish wireline transmission problems from wireless transmission problems, wherein a parameter of the transport layer protocol is a fading parameter.

20. A method according to claim 19, wherein the transport layer protocol includes a control parameter to denote congestion in the communication channel.

21. A method according to claim 20, further comprising:

instructing a server of the requested content to reduce transmission rate to alleviate congestion identified in the wired network component in response to receiving a congestion control parameter.

22. A method according to claim 19, wherein the transport layer protocol includes a control parameter to denote a fading condition in a wireless network component of the communication channel.

23. A method according to claim 22, further comprising:

calculating a delay measure when a fading condition control parameter is received; and retransmitting content from a buffer to the wireless host starting at a frame denoted by the fading condition control parameter if the delay measure does not exceed a threshold.

24. A method according to claim 23, wherein calculating the delay measure comprises:

identifying the start time of the frame denoted in the fading condition control parameter; and subtracting the start time from the current project time to quantitatively measure what kind of delay would be incurred by retransmitting frames lost during the fading condition.

25. A method according to claim 19, wherein the transport layer protocol includes a negative acknowledgment (NACK) control parameter to denote that a frame was dropped due to a high bit-error rate (BER) condition.

26. A method according to claim 25, further comprising:

identifying whether the frame denoted in the NACK control parameter is still available in a buffer of received media content;

calculating a delay measure when a NACK control parameter is received; and retransmitting the frame from the buffer to the wireless host if it is identified within the buffer;

the delay measure not exceeding a threshold.

27. A method according to claim 25, wherein calculating the delay measure comprises:

identifying the start time of the frame denoted in the NACK control parameter; and subtracting the start time from the current project time to quantitatively measure what kind of delay would be incurred by retransmitting the lost frames.

28. A transport layer protocol stored on computer readable storage medium, to facilitate streaming of media content across heterogeneous networks, the protocol comprising:

a congestion parameter, which provides a receiving network element with an measure of congestion incurred in transmission within the network;

a fading parameter which, when asserted, provides a receiving network element with an indication that a communicatively coupled wireless host just emerged from a fading condition; and a BER parameter, which provides a receiving network element with an measure of bit error rate incurred in transmission within a wireless network.

29. A transport layer protocol stored on computer readable storage medium, to facilitate streaming of media content across heterogeneous networks, the protocol generated in accordance with the following acts:

providing a server computer in a communications with a communications network;

receiving data using the protocol by way of the communications network, the protocol comprising:

a congestion parameter, which provides a receiving network element with an measure of congestion incurred in transmission within the network;

a fading parameter which, when asserted, provides a receiving network element with an indication that a communicatively coupled wireless host just emerged from a fading condition; and a BER parameter, which provides a receiving network element with an measure of bit error rate incurred in transmission within a wireless network.

* * * * *